United States Patent [19]
Tanaka et al.

[11] Patent Number: 5,385,367
[45] Date of Patent: Jan. 31, 1995

[54] INFLATABLE SEATBELT SYSTEM
[75] Inventors: Toshihiko Tanaka, Tokyo; Tsuneo Chikaraishi, Hikone, both of Japan
[73] Assignee: Takata Corporation, Tokyo, Japan
[21] Appl. No.: 99,479
[22] Filed: Jul. 30, 1993
[30] Foreign Application Priority Data
  Aug. 6, 1992 [JP] Japan .................................. 4-210355
[51] Int. Cl.6 .............................................. B60R 21/18
[52] U.S. Cl. .................................. 280/733; 280/801.1
[58] Field of Search ................. 280/733, 801 R, 801.1
[56] References Cited
U.S. PATENT DOCUMENTS
  3,929,348 12/1975 Lawwill .............................. 280/733
  3,953,640  4/1976 Takada .............................. 280/733
FOREIGN PATENT DOCUMENTS
   258239 10/1988 Japan ................................. 280/733
  1387772  3/1975 United Kingdom .
  1416517 12/1975 United Kingdom .

Primary Examiner—Kenneth R. Rice
Attorney, Agent, or Firm—Varndell Legal Group

[57] ABSTRACT

An inflatable seatbelt system designed so that the thickness of the webbing, when maintained in a strap-like configuration, is minimized, and it is possible to eliminate the webbing folding process and to reduce the amount of base fabric used and yet possible to reliably inflate the webbing when an emergency situation occurs. A shoulder belt (2) is formed from a tubular webbing (17), a tube (16) inserted in the webbing (17), and a cover (15) covering the webbing (17). The tube (16) is made of an elastic material which can be formed relatively thin and which has heat resistance and relatively high strength, e.g., urethane rubber or silicone rubber. The cover (15) is made of a resin material, e.g., polyester. The webbing (17) is made of a knitted fabric formed into a tubular configuration by weft knitting. By the use of the knitted fabric, the webbing (17) is stretchable to a large extent in the lateral direction but does not practically stretch in the longitudinal direction.

17 Claims, 14 Drawing Sheets

Rib stitch

Purl stitch

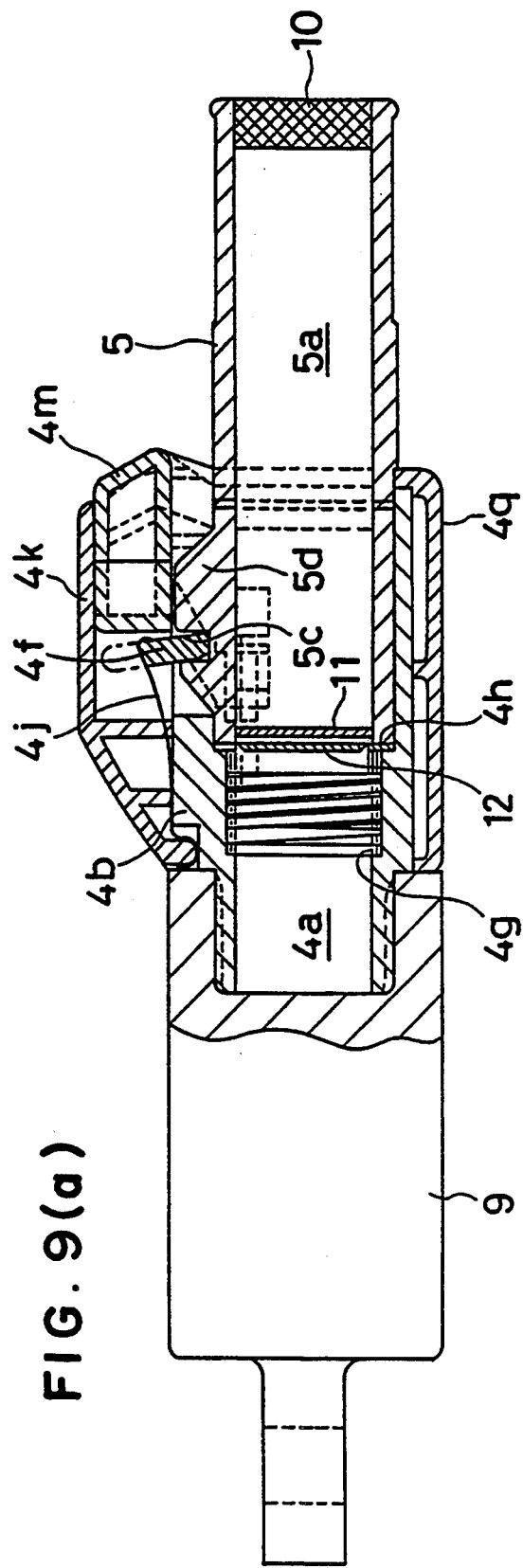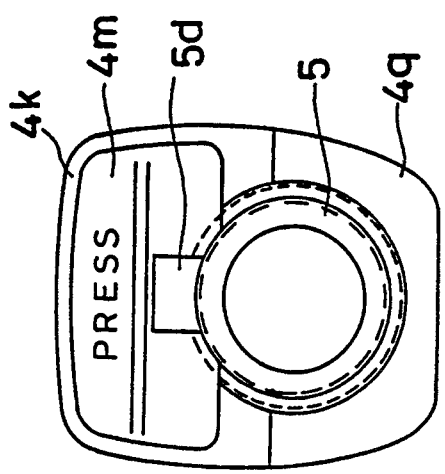
FIG. 9(a)
FIG. 9(b)

← Pseudo-purl stitch

INFLATABLE SEATBELT SYSTEM

BACKGROUND OF THE INVENTION

The present invention relates to an inflatable seatbelt system having a webbing at least a part of which is formed in the shape of a bag and which is maintained in a strap-like configuration under normal circumstances but, when an emergency situation occurs, inflates by the action of a gas supplied from a gas generating device.

Hitherto, seatbelt systems have been attached to the seats of many vehicles, for example, automobiles. A typical seatbelt system is arranged to restrain the occupant's body by a webbing under the occurrence of an emergency situation, e.g., a collision of the vehicle, thereby protecting the occupant from injury which would otherwise be done to him or her by collision with a part of the vehicle body. In such a seatbelt system, however, the width of the webbing, which constitutes a belt for restraining the occupant's body, is not so large. Therefore, the occupant's body locally receives a relatively heavy load when restrained by the webbing.

Under these circumstances, a variety of inflatable seatbelt systems have been proposed in which the webbing is formed in the shape of a bag, and under normal circumstances, the bag-shaped webbing is maintained in a strap-like configuration so as to function as an ordinary seatbelt, whereas, when an emergency occurs, the bag-shaped webbing is inflated by a gas introduced thereinto from a gas generating device so as to function as an air belt whereby the occupant's body is received by the inflated webbing. For example, see Japanese Patent Application Laid-Open (KOKAI) Nos. 47-26830 and 49-88220. Such an inflatable seatbelt system allows the kinetic energy of the occupant's body to be received by the webbing having a wider area. Thus, the load is dispersed, and hence the occupant's body receives a relatively light load. Accordingly, the occupant is protected even more effectively.

If it is intended to provide a rear seat with an air bag system as is provided for the occupant seated in the front seat, the air bag system must inevitably be provided on the front seat, which lies forwardly of the rear seat. However, if the air bag system is provided on the front seat, it is difficult for the air bag system to protect the rear seat occupant properly and effectively because the position in the longitudinal direction of the front seat depends on the occupant seated therein and the reclining position also differs according to circumstances. Accordingly, the above-described inflatable seatbelt system is particularly effective as a safety device for the rear seat.

Incidentally, various methods have heretofore been employed to maintain the bag-shaped webbing in a strap-like configuration under normal circumstances. For example, a method of maintaining a strap-like configuration is disclosed in the specification and drawings of U.S. Pat. No. 3,865,398. According to this method, both lateral margins $W_1$ and $W_2$ of a webbing W are folded, as shown in FIG. 17, and retained in their folded condition by a fastener or other appropriate engaging device F, thereby maintaining the webbing W in a strap-like configuration having a predetermined width. When the webbing W is to function as an air belt, a gas is supplied into the bag-shaped webbing W to inflate it. When the webbing W is inflated, the engagement made by the engaging device F is canceled by the expansion force. Consequently, the folded portions $W_1$ and $W_2$ are restored to their previous state, thereby allowing the webbing W to inflate to a large extent so as to provide an extremely larger width than the width of the webbing W when maintained in the strap-like configuration.

As another configuration maintaining method, for example, one such as that shown in FIG. 18 may be conceived. In this method, the bag-shaped webbing W is folded in the shape of a strap having a predetermined width in such a manner that the lateral margins $W_1$ and $W_2$ of the webbing W are reversed inward, and the webbing W is maintained in the strap-like folded condition by using a cover C. When the webbing W is inflated, the sewn part of the cover C is cut off by the expansion force, thereby allowing the webbing W to inflate to a large extent in the same way as the above-described configuration maintaining method.

These conventional configuration maintaining methods for the webbing W suffer, however, from some problems stated below. According to the conventional methods, the webbing W is first formed in a size which is the same as that of the webbing W when inflated, and the webbing W in this condition is folded and thereby maintained in the shape of a strap having a predetermined width so as to function as a seatbelt. Therefore, the webbing W in the folded state is unfavorably thick and bulky. For this reason, when the occupant fastens the seatbelt, the webbing W cannot snugly fit to the occupant's body, making the occupant feel uncomfortable. In addition, the seatbelt cannot smoothly be guided.

Further, since the webbing W is in a folded state, it cannot smoothly be inflated even when the gas is supplied into the bag-shaped webbing W.

In addition, the conventional methods need an operation of folding the webbing W and hence involve a large number of operating steps. Further, when produced, the webbing W needs to be cut into a width which is the same as the width thereof in the inflated condition. Therefore, a large amount of base fabric must be used.

SUMMARY OF THE INVENTION

In view of the above-described problems, it is an object of the present invention to provide an inflatable seatbelt system which is designed so that when maintained in a strap-like configuration under normal circumstances, the webbing is not thick nor bulky, and it is possible to eliminate the folding process and to reduce the amount of base fabric used and yet possible to inflate the webbing surely and speedily when an emergency situation occurs.

To attain the above-described object, the present invention provides an inflatable seatbelt system for a vehicle including at least: a device for generating a gas when deceleration acting on the vehicle upon the occurrence of an emergency situation, for example, a collision of the vehicle, exceeds first set deceleration; a webbing having a portion brought into contact with the occupant's body, at least a part of the contact portion being formed as a bag-shaped portion, the webbing being arranged such that when no gas is generated from the gas generating device, the webbing is maintained in the shape of a strap having a predetermined width, whereas, when a gas is generated from the gas generating device, the bag-shaped portion is inflated by the gas; a retractor operating such that when the deceleration on the vehicle is not higher than second set deceleration, which is lower than the first set deceleration, the retractor allows the webbing to be freely wound up and unwound, whereas, when the deceleration on the vehicle exceeds the second set deceleration, the retractor prevents unwinding of the webbing; a tongue connected to the webbing; and a buckle device with which the tongue is disengageably engaged. The bag-shaped portion of the webbing is formed of a knitted fabric.

The knitted fabric may be formed by weft knitting.

The knitted fabric may be formed by warp knitting.

The knitted fabric may have warp threads inserted therein.

A tube which is inflatable by the gas may be inserted into the bag-shaped portion of the webbing.

The tube may be formed of either urethane rubber or silicone rubber.

The arrangement may also be such that the tongue is connected to the bag-shaped portion of the webbing, and the tongue is formed with a gas flow hole, and that the buckle device is provided with the gas generating device and formed with a gas flow hole communicated with the gas generating device so that when the tongue is engaged with the buckle device, the gas flow hole formed in the tongue and the gas flow hole formed in the buckle device form a gas flow passage for introducing the gas generated by the gas generating device into the bag-shaped portion of the webbing.

In the inflatable seatbelt system according to the present invention, arranged as described above, if the deceleration acting on the vehicle is higher than the second set deceleration and not higher than the first set deceleration, the gas generating device is not activated. At this time, the webbing is maintained in the shape of a strap having a predetermined width, and the warp does not stretch by virtue of its load-elongation characteristics. Therefore, the webbing surely restrains the occupant's body. Accordingly, the inflatable seatbelt system functions as a seatbelt similar to the conventional seatbelt.

If the deceleration on the vehicle exceeds the first set deceleration, the gas generating device is activated to generate a gas. Consequently, the bag-shaped portion of the webbing is inflated by the gas. In this case, the inflation of the bag-shaped portion is realized by the stretching of the weft caused by the expansion force produced when the bag-shaped portion of the webbing is inflated by the gas. Since the occupant's body is surely and effectively supported by the inflated bag-shaped portion of the webbing, the kinetic energy of the occupant's body is received over a relatively wide area. As a result, the load is dispersed, and the occupant is reliably protected from a heavy impact load. That is, the inflatable seatbelt system functions as an air belt. Moreover, since the warp does not practically stretch at this time, the inflatable seatbelt system also functions as a seatbelt.

Further, since the weft of the webbing base fabric stretches when the webbing is inflated by the gas from the gas generating device, the width of the webbing base fabric need not be set equal to a relatively large width of the webbing after the inflation but may be set to be the same as a predetermined width of the seatbelt under normal circumstances. Accordingly, it becomes unnecessary to fold the webbing, and the thickness of the seatbelt under normal circumstances can be made extremely small. Thus, the seatbelt can be unwound and rewound even more smoothly. In addition, since it is possible to minimize the belt take-up capacity of the seatbelt retractor, the retractor can be formed in an even more compact structure.

Further, since the seatbelt need not be folded, there is no need for a seatbelt folding operation, which requires a great deal of time and labor, during the assembly of the seatbelt. Accordingly, it is possible to reduce the number of operating steps required for the production of the seatbelt and to assemble the seatbelt extremely easily.

In addition, the width of the knitted fabric of the tubular webbing, constituting the seatbelt, when in a flattened state can be set equal to the width of the ordinary seatbelt. Therefore, the amount of base fabric used can be reduced by a large margin in comparison to the conventional inflatable seatbelt.

The use of a knitted fabric for the webbing makes it possible to obtain extremely excellent stretching characteristics that stretching is large in the lateral direction and small in the longitudinal direction in comparison to woven fabrics.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 2(a) and 2(b) are views showing a shoulder belt employed in the embodiment, in which FIG. 2(a) is a perspective view showing constituent elements of the shoulder belt in a staggered manner, and FIG. 2(b) is a cross-sectional view of the shoulder belt.

FIGS. 4(a) and 4(b) are views showing a webbing in the embodiment which is made of a weft-knitted fabric formed by plain stitch, in which FIG. 4(a) shows the face stitch of the weft-knitted fabric, and FIG. 4(b) shows the back stitch thereof.

FIGS. 8(a) and 8(b) are views showing caps employed in the embodiment, in which FIG. 8(a) shows a tongue-side cap, and FIG. 8(b) shows a buckle-side cap.

FIGS. 9(a) and 9(b) are views showing the buckle device and the tongue, which are engaged with each other, in which FIG. 9(a) is a partly-sectioned front view of the buckle device and the tongue, and FIG. 9(b) is a side view of the two members as seen from the right-hand side thereof.

DESCRIPTION OF THE PREFERRED EMBODIMENTS

Embodiments of the present invention will be described below with reference to the accompanying drawings.

Figure 1:
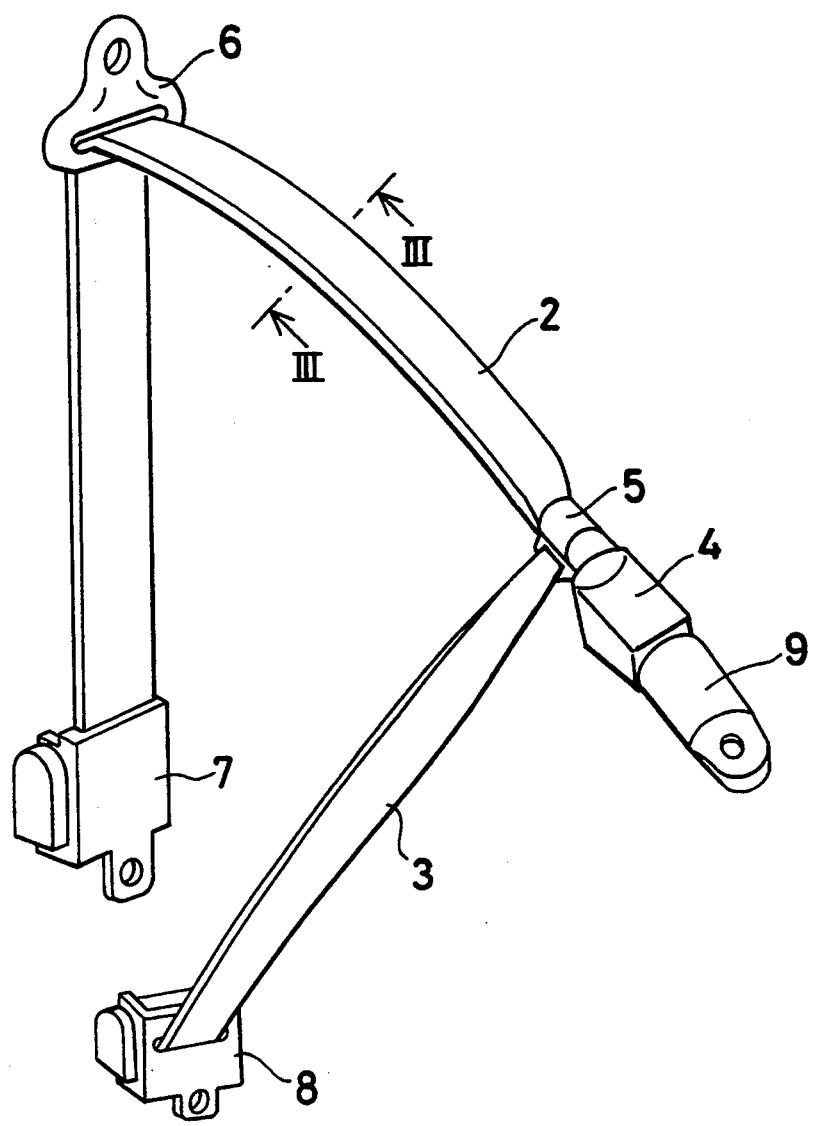
FIG. 1 schematically shows the whole arrangement of one embodiment of the inflatable seatbelt system according to the present invention.
Figure 2A:
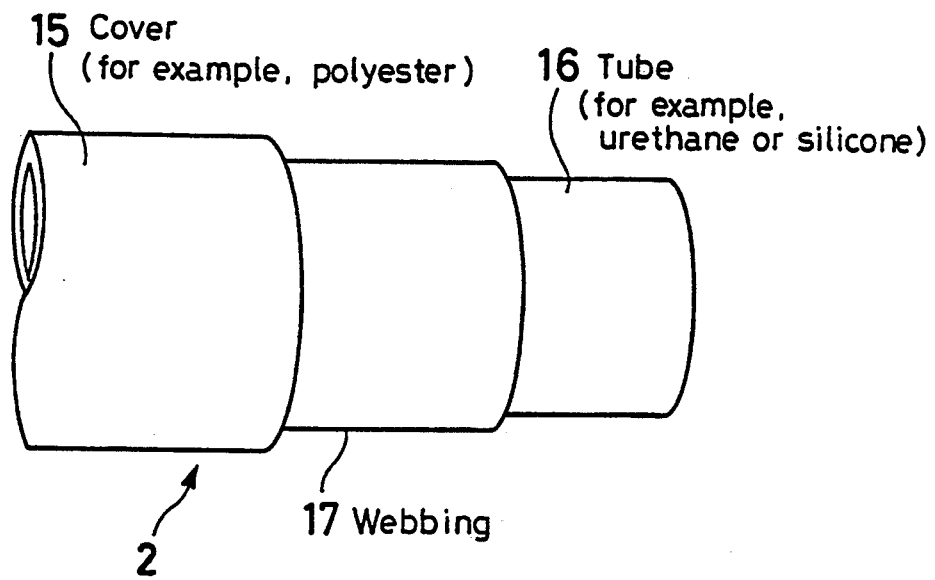
Figure 2B:
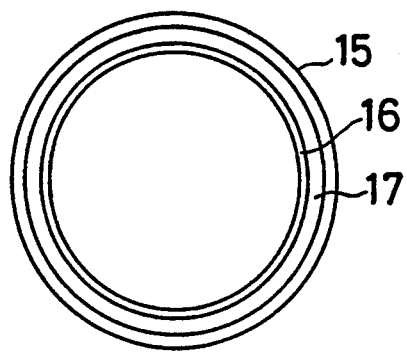
Figure 3:
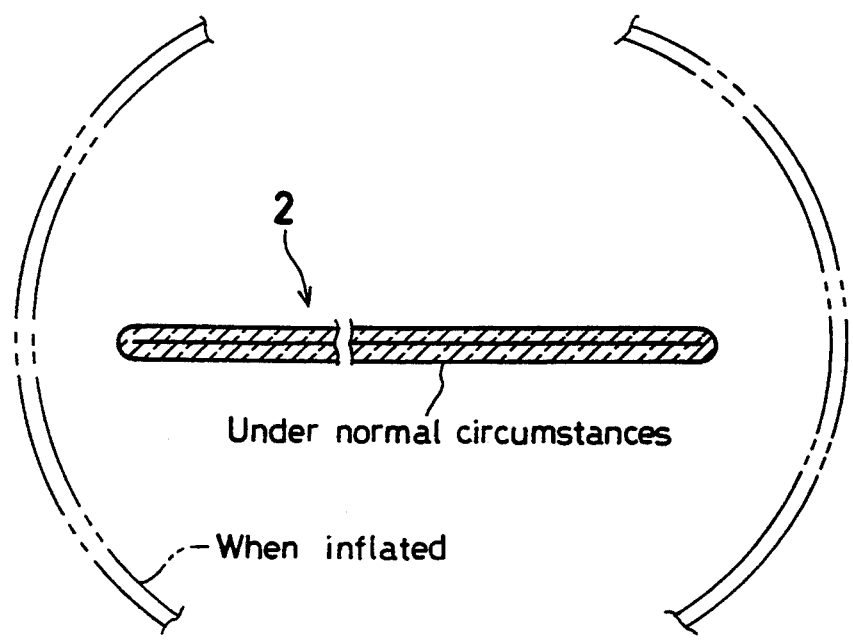
FIG. 3 is a sectional view taken along the line III—III in FIG. 1, showing the shoulder belt under two different conditions, i.e., under normal circumstances, and in an inflated state.
Figure 4A:
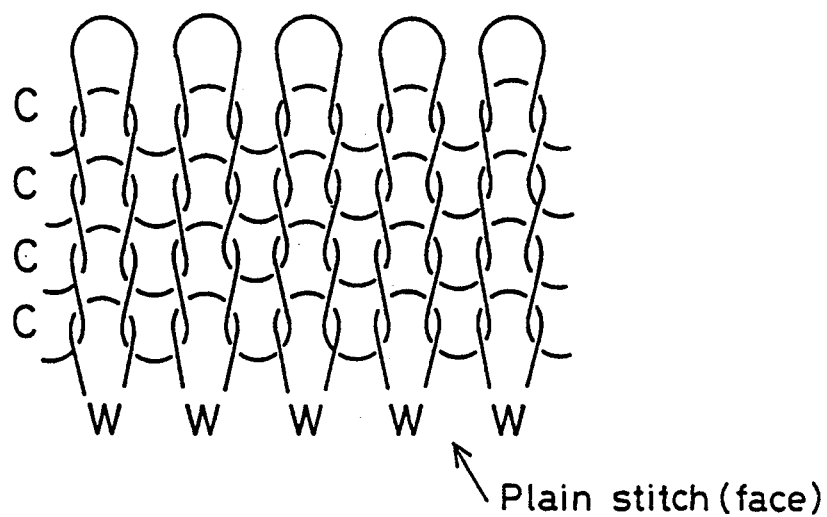
Figure 4B:
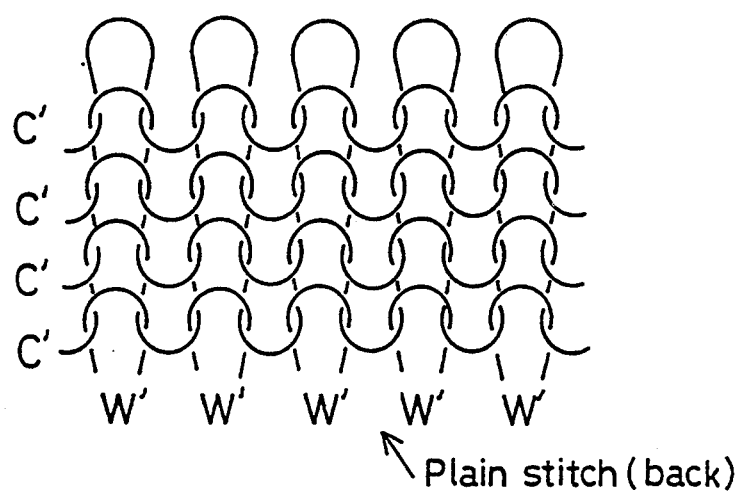

FIG. 1 schematically shows the whole arrangement of one embodiment of the inflatable seatbelt system according to the present invention. FIG. 2 shows a shoulder belt employed in this embodiment, in which FIG. 2(a) is a perspective view showing constituent elements of the shoulder belt in a staggered manner, and FIG. 2(b) is a cross-sectional view of the shoulder belt. FIG. 3 is a sectional view taken along the line III—III in FIG. 1, showing the shoulder belt under two different conditions, i.e., under normal circumstances, and in an inflated state. FIGS. 4(a) and 4(b) show a webbing employed in this embodiment.

As shown in FIG. 1, the inflatable seatbelt system 1 in this embodiment has a shoulder belt 2 disposed to extend obliquely downward from one side to the other of the occupant's body (from the right-hand side to the left-hand side in the illustrated example), a lap belt 3 disposed to extend from one side to the other of the occupant's body (from the right-hand side to the left-hand side in the illustrated example), a buckle device 4 connected to a belt (not shown) secured, for example, to the floor of a vehicle body, a tongue 5 inserted into the buckle device 4 so as to be engaged therewith when the occupant fastens the seatbelt, a pillar anchor 6 disposed on a center pillar or other vehicle body member to serve as an intermediate guide for guiding the shoulder belt 2, a retractor 7 with a clamp for winding up the shoulder belt 2, a retractor 8 for winding up the lap belt 3, and a gas generator (G.G.) 9, serving as a gas generating device, which is connected to the buckle device 4.

The shoulder belt 2 is designed to lie on the parts of the occupant's body which are to be held, i.e., one shoulder, the chest and the belly. One end of the shoulder belt 2 is connected to the tongue 5, and the other end thereof is connected to the seatbelt retractor (ELR) 7 secured to the vehicle body.

As shown in FIGS. 2(a) and 2(b), the shoulder belt 2 is formed from a tubular webbing 17, a tube 16 inserted in the webbing 17, and a cover 15 covering the webbing 17. The tube 16 is made of an elastic material which can be formed relatively thin and which has heat resistance and relatively high strength, e.g., urethane rubber or silicone rubber. The cover 15 is made of a resin material, e.g., polyester. The end of the shoulder belt 2 which is connected to the seatbelt retractor 7 is closed so that the shoulder belt 2 is formed in the shape of a bag.

Under normal circumstances, the bag-shaped shoulder belt 2 is maintained in a flat strap-like configuration, as shown by the solid line in FIG. 3. The shoulder belt 2 is set so that under normal circumstances it has a predetermined width (e.g., 50 mm), which is approximately equal to the width of a typical conventional seatbelt. When a reaction gas from the gas generator 9 is introduced thereinto, the shoulder belt 2 inflates to a substantial degree, as shown by the two-dot chain line. It should be noted that one end of the shoulder belt 2 is connected to the tongue 5 by fitting it to the outer periphery of one end portion of the tongue 5, and the joint of the shoulder belt 2 and the tongue 5 is kept airtight so that the reaction gas will not leak.

The webbing 17 is made of a knitted fabric formed into a tubular configuration by weft knitting. Basic patterns of weft knitting include plain stitch as shown in FIG. 4, rib stitch as shown in FIG. 5, and purl stitch as shown in FIG. 6.

The plain stitch shown in FIGS. 4(a) and 4(b) is the simplest pattern, in which knitted loops are sequentially arranged in side-by-side relation to each other, and the face and back of the fabric differ from each other. FIG. 4(a) shows the face stitch of the plain stitch, in which the wales w of the face stitch sequentially extend lengthwise, and the courses c of the face stitch sequentially extend breadthwise. FIG. 4(b) shows the back stitch of the plain stitch, in which the wales w' of the back stitch sequentially extend lengthwise, and the courses c' of the back stitch sequentially extend breadthwise. The wales w are disposed in the longitudinal direction of the webbing 17, and the courses c are disposed in the lateral direction of the webbing 17.

Figure 5:
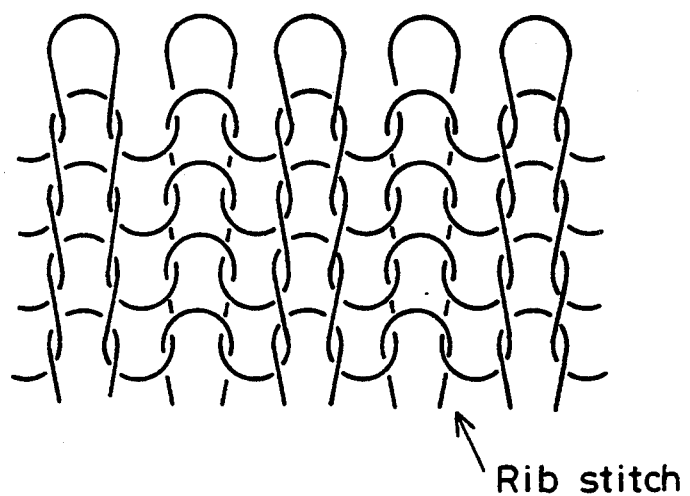
FIG. 5 shows an example of rib stitch which may be used as a knitting pattern for the knitted fabric.

The rib stitch shown in FIG. 5 has a loop pattern in which the wales w of the face stitch and the wales w' of the back stitch alternately extend lengthwise. Accordingly, the courses c of the face stitch and the courses c' of the back stitch are alternately disposed. A pattern in which the wales of the face and back stitches are alternately disposed, as shown in the figure, is referred to as "1×1 rib stitch". There are various other derivative rib stitches, for example, "2×1 rib stitch", "2×2 rib stitch", etc. This type of knitted fabric is identical on the face and back and shows an external appearance as if it were comprised only of the face stitch. The rib fabric is remarkably stretchable in the breadthwise direction (i.e., the horizontal direction as viewed in FIG. 5).

Figure 6:
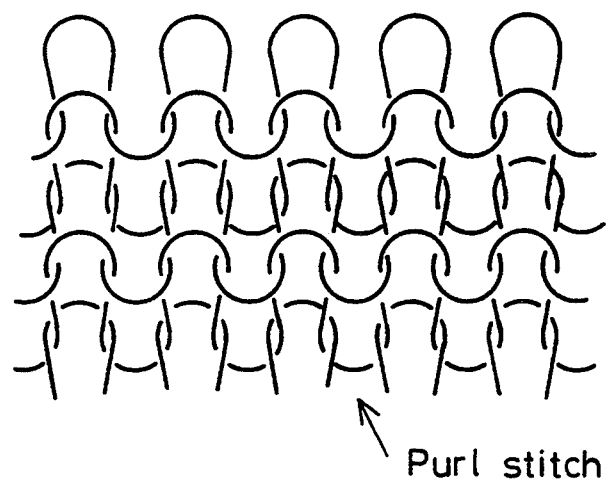
FIG. 6 shows an example of purl stitch which may be used as a knitting pattern for the knitted fabric.

The purl stitch shown in FIG. 6 has a loop pattern in which the courses c of the face stitch and the courses c' of the back stitch alternately extend breadthwise. This pattern is identical on the face and back and shows an external appearance as if it were comprised only of the back stitch. In this case, the wales w of the face stitch and the wales w' of the back stitch are alternately disposed. The fabric formed by this purl stitch is stretchable in the lengthwise direction.

By using a weft-knitted fabric formed by these knitting methods, a webbing is formed so as to have such stretching characteristics that it is stretchable to a large extent in the lateral direction but only slightly stretchable in the longitudinal direction.

When a tubular webbing 17 with a width of 50 mm was actually made of a weft-knitted fabric formed by rib knitting, the webbing 17 had such stretching characteristics that it was stretchable to a large extent in the lateral direction. Further, a tubular webbing 17 with a width of 50 mm was made of a weft-knitted fabric formed by rib knitting, and with a tube inserted into the webbing 17, an internal pressure was applied thereto. As a result, the webbing 17 inflated to a large extent in the lateral direction and, at the same time, contracted longitudinally. Thus, since the webbing inflates to a high degree in the lateral direction, the width of the belt widens, resulting in an increase in the area of contact with the occupant's body. Therefore, it is possible to reduce the impact which may be applied to the occupant's body and to protect the occupant even more reliably. Further, since the webbing contracts lengthwise, it can function as a pretensioner for the seatbelt.

In addition, by changing the density of the courses c and c' of the rib stitch, it is possible to adjust the extent of the lateral inflation of the webbing. Accordingly, it is possible to set the webbing so that the necessary portion of the webbing will inflate to a large extent, whereas the inflation of the unnecessary portion will be minimal. By forming the webbing as described above, it is possible to obtain the same effectiveness as that of an air belt and, at the same time, to minimize the amount of gas required.

The lap belt 3 is formed of a normal belt similar to a typical conventional seatbelt. One end of the lap belt 3 is connected to the tongue 5, and the other end thereof is connected to the seatbelt retractor (ELR) 8 secured to the vehicle body.

Figure 7:
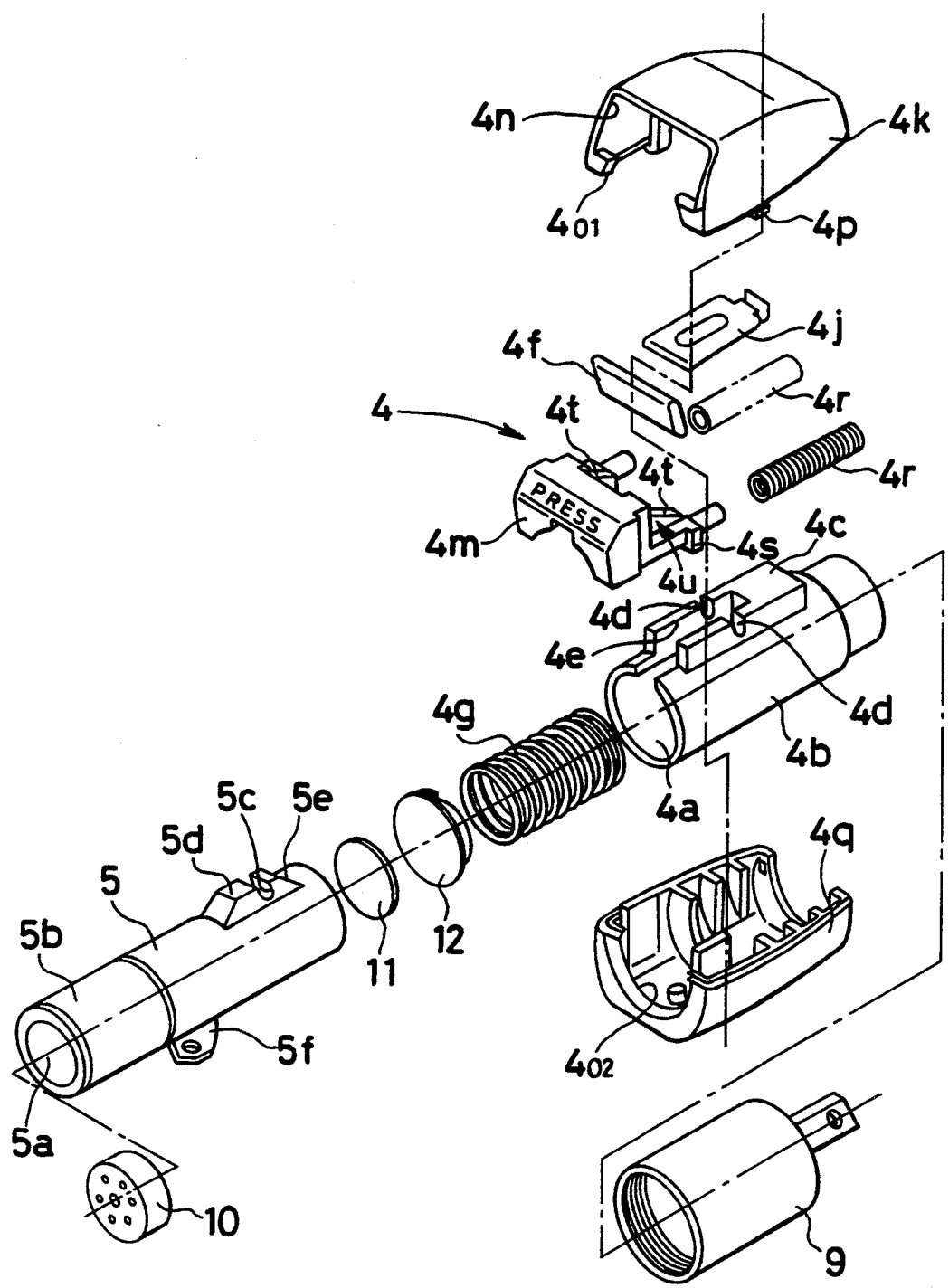
FIG. 7 is an exploded perspective view showing a buckle device, a tongue, and a gas generating device, which are employed in the embodiment.

As shown in FIG. 7, the tongue 5 is formed in the shape of a circular cylinder having a gas flow hole 5a. The tongue 5 is connected to the shoulder belt 2 by fitting the latter to the outer periphery of one end portion 5b of the tongue 5 in an airtight manner. The other end portion of the tongue 5 is formed with an engagement portion 5d having a groove 5c which is engageable with a pawl (denoted by reference numeral 4f in FIG. 7), described later. The engagement portion 5d has a slant surface 5e formed on the side thereof which is closer to the second end of the tongue 5. The tongue 5 further has a connecting portion 5f formed in an approximately central portion thereof, to which the lap belt 3 is connected.

Figure 8A:
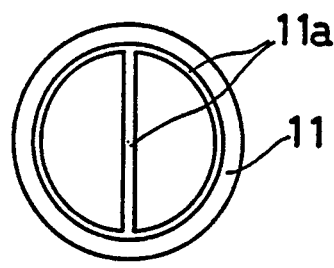

In the gas flow hole 5a of the tongue 5, a filter 10 is retained by a T-cap at the first end 5b of the tongue 5. In addition, a tongue-side cap 11 (clearly shown in FIG. 9) is provided at the second end of the tongue 5. The filter 10 cools the high-temperature gas flowing into the shoulder belt 2 and also prevents the intrusion of foreign matter into the shoulder belt 2. As shown in FIG. 8(a), the tongue-side cap 11 is provided with notches 11a. Under normal circumstances, the cap 11 closes the gas flow hole 5a of the tongue 5 to prevent the intrusion of foreign matter into the gas flow hole 5a. However, when a gas is generated in an emergency, the cap 11 is readily broken at the notches 11 by the pressure of the gas, thereby ensuring a gas flow passage.

Since the tongue 5 is formed in a cylindrical configuration and the gas flow hole 5a need not be made very large, the tongue 5 can be formed in a compact structure as a whole, so that it can readily be brought into and out of engagement with the buckle device 4 with improved operability.

As shown in FIG. 7, the buckle device 4 includes a cylindrical buckle body 4b having a gas flow hole 4a. The buckle body 4b is formed so that the second end portion of the tongue 5 can be fitted into the gas flow hole 4a from one end of the buckle body 4b. The gas generator 9 is fitted and secured to the other end portion of the buckle body 4b. The buckle body 4b further has a projection 4c formed on the outer peripheral surface thereof. The projection 4c is formed with grooves 4d extending perpendicularly to the axial direction of the buckle body 4b so that the pawl 4f is fitted into the grooves 4d to effect locking. In addition, a groove 4e is axially formed to extend over from the projection 4c to the buckle body 4b so that the engagement portion 5d of the tongue 5 can be fitted into the groove 4e.

As shown in FIGS. 7 and 9(a), a spring 4g is disposed in the gas flow hole 4a of the buckle body 4b to bias the tongue 5, when fitted in the gas flow hole 4a, in a direction in which the tongue 5 gets out of the gas flow hole 4a. A buckle-side cap 12 is attached to one end of the spring 4g. The buckle-side cap 12 is slidable between a position where the tongue 5 is not fitted in the gas flow hole 4a and hence the spring 4g is in a free state, and a position where the tongue 5 is fitted into the gas flow hole 4a and pressed so as to abut against a step portion 4h of the gas flow hole 4a.

Figure 8B:
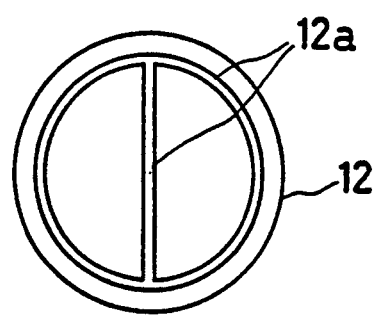

In addition, the buckle-side cap 12 is provided with notches 12a, as shown in FIG. 8(b). Under normal circumstances, the cap 12 closes the gas flow hole 4a of the buckle body 4b to prevent foreign matter from entering the gas flow hole 4a on the gas generator side through the cap 12. When a gas is generated in an emergency, the cap 12 is readily broken at the notches 12a by the pressure of the gas, thereby ensuring a gas flow passage.

As shown in FIGS. 9(a) and 9(b), the pawl 4f is fitted into the grooves 4d. The pawl 4f is constantly biased in the direction for fitting into the grooves 4d by the action of a spring 4j, which is a leaf spring. Thus, when the tongue 5 is fitted into the gas flow hole 4a of the buckle body 4b, the pawl 4f is pushed upwardly by the slant surface 5e of the engagement portion 5d of the tongue 5 against the biasing force of the spring 4j as the tongue 5 moves axially. When the tongue 5 comes in abutment on the step portion 4h of the gas flow hole 4a through the buckle-side cap 12, the groove 5c of the engagement portion 5d of the tongue 5 aligns with the grooves 4d of the buckle body 4b. Consequently, the pawl 4f fits in and engages with the groove 5c by the action of biasing force of the spring 4j. When the pawl 4f is engaged with the groove 5c, the tongue 5 is unable to get out of the buckle body 5b. One end of the spring 4j is clamped between an upper cover 4k of the buckle device 4 and the projection 4c.

As shown in FIG. 7, the upper cover 4k is formed with an opening 4n in which an operating button 4m fits, and one part 4o₁ of an opening 4o in which the tongue 5 fits. The upper cover 4k is further formed with an engaging member 4p so that when the upper cover 4k is combined with a lower cover 4q, the engaging member 4p is engaged with an engagement portion (not shown) of the lower cover 4q, thereby forming a cover for the buckle device 4b. The lower cover 4q is formed with the other part 4o₂ of the opening 4o in which the tongue 5 fits. Thus, when the upper cover 4k and the lower cover 4q are combined with each other, one circular opening 4o is formed.

The operating button 4m is fitted in the opening 4n of the upper cover 4k in such a manner that it is capable of being projected from and withdrawn into the opening 4n. The operating button 4m is constantly biased in a direction in which it projects from the opening 4n by the action of a pair of coil springs 4r compressedly loaded in between the same and the upper cap 4k. In this case, engagement projections 4s which are formed on both sides of the operating button 4m are engaged with respective engagement portions (not shown) provided at predetermined positions on the upper cap 4k, thereby limiting the amount of projection of the operating button 4m. The position where the engagement projections 4s are engaged with the engagement portions of the upper cap 4k is the inoperative position of the operating button 4m as shown by the solid line in FIG. 9.

The operating button 4m is further formed on both left and right sides thereof with a pair of pawl raising portions 4u having slant surfaces 4t, respectively. The slant surfaces 4t of the pawl raising portions 4u are arranged so that when the operating button 4m moves axially, it comes under the pawl 4f. When the operating button 4m is pushed toward the position shown by the two-dot chain line in FIG. 9 in a state where the tongue 5 and the buckle device 4 are connected together as shown in the figure, the slant surfaces 4t come in contact with the lower end of the pawl 4f and raise the pawl 4f as the operating button 4m moves axially. As a result, the pawl 4 gets out of the grooves 4d and 5c, thus allowing the tongue 5 to disengage from the buckle device 4.

In the inflatable seatbelt system 1 of this embodiment, arranged as described above, the bag-shaped shoulder belt 2 is normally maintained in the strap-like configuration, as shown by the solid line in FIG. 3. When the buckle device 4 and the tongue 5 are not engaged with each other, the gas flow hole 4a of the buckle device 4 is closed by the cap 12, and the gas flow hole 5a of the tongue 5 is also closed by the cap 11. There is therefore no likelihood that foreign matter will enter the gas generator 9 or the shoulder belt 2.

The occupant seated in the seat engages the tongue 5 with the buckle device 4 by insertion, thereby fastening the belt to his/her body. In this belt set condition, the pawl 4f is fitted in and engaged with the groove 5c. Therefore, the tongue 5 and the buckle device 4 are maintained in the connected condition without likelihood of the tongue 5 disengaging from the buckle device 4. Further, when the tongue 5 and the buckle device 4 are connected together, the gas flow holes 4a and 5a align with each other to form a single gas flow passage. Under normal circumstances, however, the gas flow holes 4a and 5a are cut off from each other by the caps 11 and 12.

Further, in the belt set condition, the shoulder belt 2 and the lap belt 3 are biased in the winding direction with relatively weak force by the respective seatbelt retractors 7 and 8. Since this weak force gives no sensation of pressure to the occupant and the take-up reels of the seatbelt retractors 7 and 8 are not locked, both the belts 2 and 3 can be unwound freely. Thus, the shoulder belt 2 and the lap belt 3 are smoothly unwound and rewound in response to the normal movement of the occupant's body, thereby allowing an improvement in the comfortability of the seatbelt.

If the deceleration acting on the vehicle exceeds second set deceleration during the running of the vehicle, the occupant's body is urged to move forwardly by inertia force, pressing both the belts 2 and 3 to be unwound from the respective seatbelt retractors 7 and 8. However, at this time, the deceleration sensors associated with the retractors 7 and 8 operate to lock the take-up reels, thereby preventing the belts 2 and 3 from being unwound. Accordingly, the occupant's body is effectively and reliably restrained by the shoulder and lap belts 2 and 3, thereby being prevented from moving forwardly. At this time, the shoulder belt 2 is guided by the intermediate guide 6 so as to come in contact with the correct position on the occupant's body. Thus, the inflatable seatbelt system 1 of this embodiment functions as a seatbelt for restraining the occupant's body in a similar manner to the conventional seatbelt system.

If extremely high deceleration acting on the vehicle upon the occurrence of an emergency, e.g., a collision of the vehicle, exceeds first set deceleration, the gas generator 9 is activated to generate a high-pressure gas. Referring to FIG. 9, the gas thus generated instantaneously enters the gas flow hole 4a of the buckle device 4 and collides against the buckle-side cap 12, causing the cap 12 to break. Thus, a gas flow passage is formed. Consequently, the gas further collides against the tongue-side cap 11, and the cap 11 is similarly broken. As a result, the gas flow hole 4a on the buckle device side and the gas flow hole 5a on the tongue side are communicated with each other. Accordingly, the gas generator 9 is directly communicated with the shoulder belt 2, and a gas flow passage is formed between the gas generator 9 and the shoulder belt 2. Consequently, the gas generated from the gas generator 9 enters the shoulder belt 2 through the gas flow hole 5a. Therefore, the shoulder belt 2 inflates substantially instantaneously without fail. At this time, foreign substances, i.e., the residue remaining at the end of the gas reaction in the gas generator 9, fragments of the caps 11 and 12, etc., are captured by the filter 10. There is therefore no likelihood that such foreign substances will enter the shoulder belt 2.

Accordingly, the upper half of the occupant's body, i.e., the shoulder, the chest, etc., is surely and effectively supported by the inflated shoulder belt 2. Since the kinetic energy of the occupant's body is received with a relatively wide area by virtue of the inflation of the shoulder belt 2, the load is dispersed, and the occupant is reliably protected from a heavy impact load. That is, the inflatable seatbelt system 1 functions as an air belt.

When the shoulder belt 2 inflates, it stretches to a large extent in the lateral direction but slightly contracts in the longitudinal direction due to the inflation thereof. As a result, the inflatable seatbelt system 1 can function as a pretensioner by virtue of the inflation of the shoulder belt 2, thereby enabling the slack in the seatbelt to be taken up. Thus, the inflatable seatbelt system 1 surely and effectively exhibits the seatbelt function, resulting in an improvement in the occupant restraining performance of the seatbelt.

To release the tongue 5 from the buckle device 4, the operating button 4m is pressed. Consequently, the pawl 4f moves upward to get out of the grooves 4d and 5c, thus allowing the tongue 5 to disengage from the buckle device 4. Since the tongue 5 is constantly biased in the direction in which it releases from the buckle device 4 by the action of the spring 4g, the tongue 5 can readily release from the buckle device 4.

With the inflatable seatbelt system 1 of this embodiment, arranged as described above, the shoulder belt 2 can inflate to a large extent in the lateral direction by virtue of the webbing 17 formed of a knitted fabric. Therefore, under normal circumstances, the shoulder belt 2 can be maintained in a configuration having the same width as that of the conventional seatbelt simply by flattening it. Accordingly, the thickness of the shoulder belt under normal circumstances can considerably be reduced in comparison to the folded shoulder belt in the conventional inflatable seatbelt system. Thus, the shoulder belt can be unwound and rewound even more smoothly. In addition, since it is possible to minimize the belt take-up capacity of the seatbelt retractor 7, the retractor 7 can be formed in an even more compact structure. Further, since the shoulder belt need not be folded, it is unnecessary to conduct a seatbelt folding operation, which requires a great deal of time and labor, during the assembly of the seatbelt. Accordingly, it is possible to reduce the number of operating steps needed for the production of the seatbelt and to assemble the seatbelt extremely easily.

In addition, since the webbing 17 which constitutes the shoulder belt 2 is set to have a width equal to that of the conventional seatbelt, the amount of base fabric used can be reduced by a large margin in comparison to the conventional inflatable seatbelt.

Figure 10:
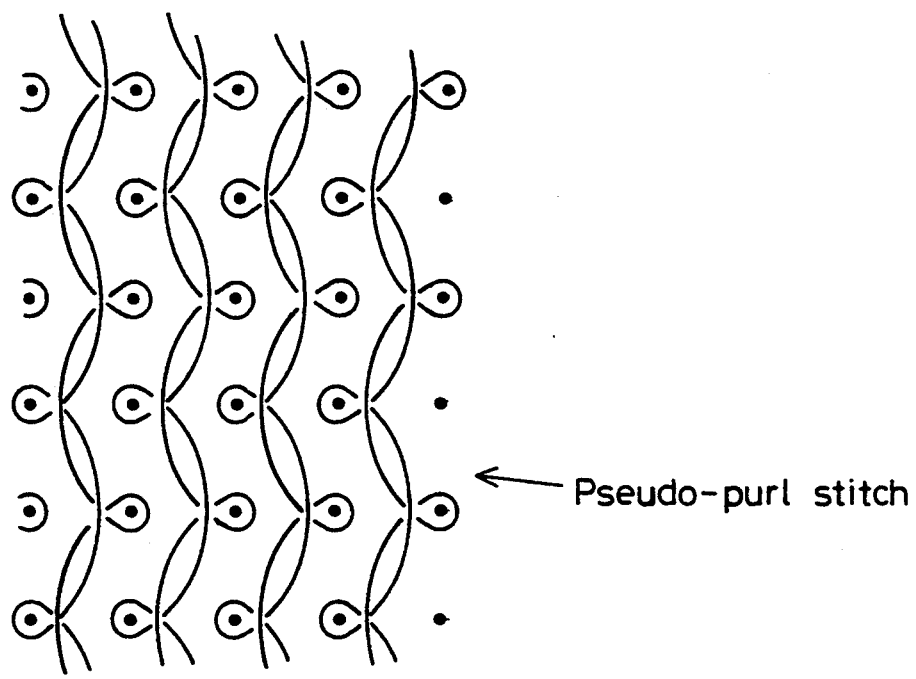
FIG. 10 shows a webbing made of a warp-knitted fabric formed by pseudo-purl stitch in another embodiment of the present invention.
Figure 11:
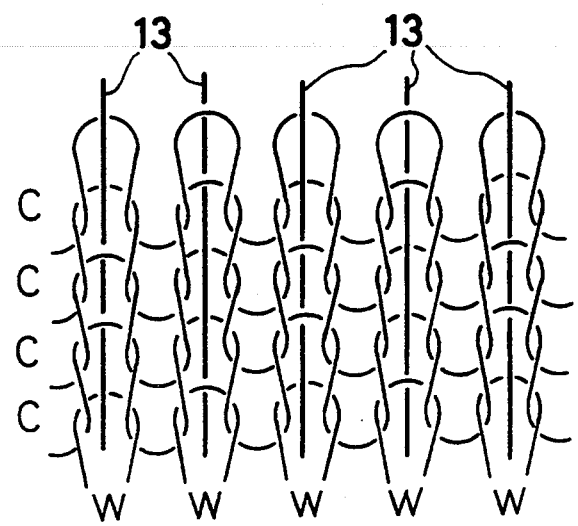
FIG. 11 shows a webbing comprising a combination of a weft-knitted fabric formed by plain stitch and warp threads inserted thereinto in still another embodiment of the present invention.
Figure 12:
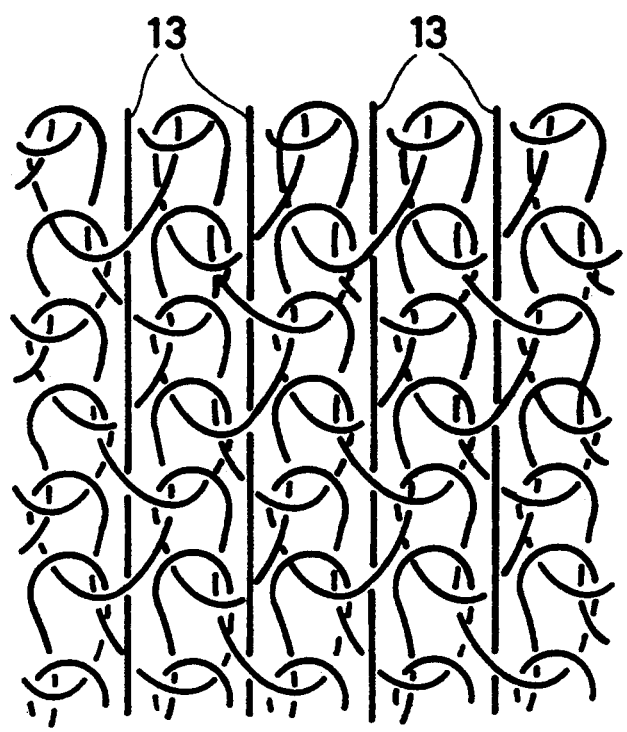
FIG. 12 shows a webbing comprising a combination of a warp-knitted fabric formed by single denbigh stitch and warp threads inserted into thereinto.
Figure 13:
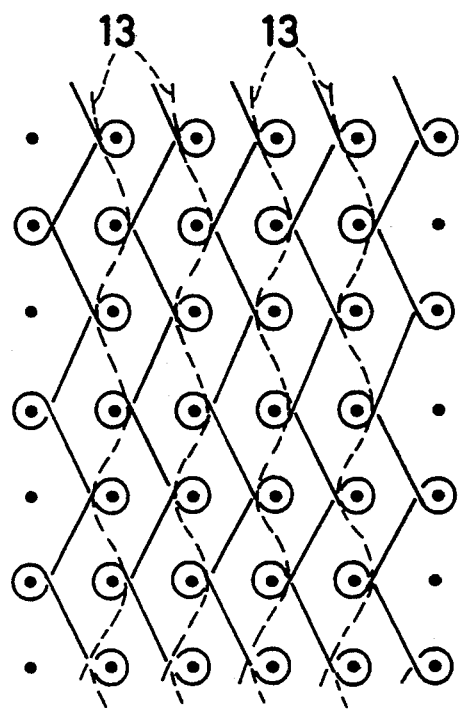
FIG. 13 shows another example of a webbing comprising a combination of a warp-knitted fabric and warp threads inserted thereinto.
Figure 14:
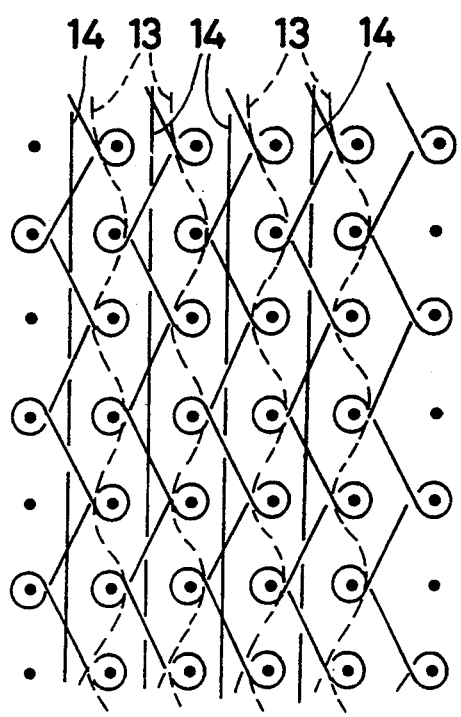
FIG. 14 shows still another example of a webbing comprising a combination of a warp-knitted fabric and warp threads inserted thereinto.

FIG. 10 shows another embodiment of the present invention.

In this embodiment, a knitted fabric formed by warp knitting is employed as one for forming the webbing 17. Warp knitting includes pseudo-purl stitch as shown in FIG. 10. It should be noted that the webbing 17 may also be made of a knitted fabric formed by other warp knitting method, e.g., single denbigh stitch, double tricot stitch, or plain tricot stitch.

The webbing 17 made of a knitted fabric formed by such warp knitting also provides the same advantageous effects as those in the case of the above-described weft-knitted fabric.

FIGS. 11 to 14 show other embodiments of the present invention. In each of the embodiments shown in these figures, warp threads are inserted into a knitted fabric forming the webbing 17, thereby increasing the strength in the lengthwise (longitudinal) direction of the webbing 17. That is, in the embodiment shown in FIG. 11, the webbing 17 is formed of a combination of a weft-knitted fabric formed by plain stitch and warp threads 13 inserted thereinto. In the embodiments shown in FIGS. 12 and 13, the webbing 17 is formed of a combination of a warp-knitted fabric formed by single denbigh stitch and warp threads 13 inserted thereinto. In the embodiment shown in FIG. 14, the webbing 17 is formed by further inserting second warp threads 14 into the webbing shown in FIG. 13.

By inserting the warp threads 13 and 14 into a knitted fabric in this way, the lengthwise strength of the webbing 17 is enhanced. It is therefore possible to suppress the lengthwise stretch of the shoulder belt 2. In addition, even if large tensile force is applied to the shoulder belt 2, it is effectively borne by the warp threads 13 and 14. Accordingly, it is possible to use relatively fine yarn as knitting yarn for forming a knitted fabric.

Figure 15:
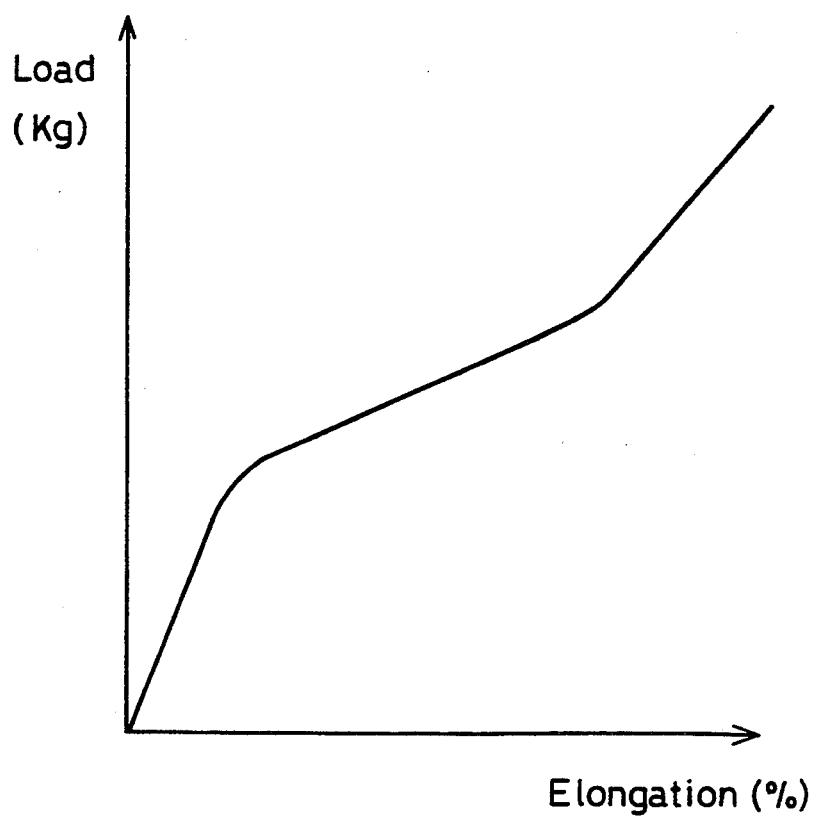
FIG. 15 is a graph showing load-elongation characteristics of knitting yarn used for the knitted fabric.

The webbing 17 that is made of a knitted fabric formed by weft knitting or warp knitting as described above shows particularly high structural stretchability in comparison to woven fabrics. If yarn having load-elongation characteristics as shown in FIG. 15 is used for the above-described knitted fabrics, the air belt effect can be obtained even more satisfactorily.

It should be noted that the present invention is not necessarily limited to the foregoing embodiments and that various changes and modifications in design may be imparted thereto. For example, although in the above-described embodiments a tubularly knitted fabric is used to form a webbing, it is also possible to form a webbing by joining together the respective lateral edges of two planar fabrics laid one on top of the other. Alternatively, a webbing may be formed by bending a single planar fabric and joining together both lateral edges of the fabric.

Figure 16:
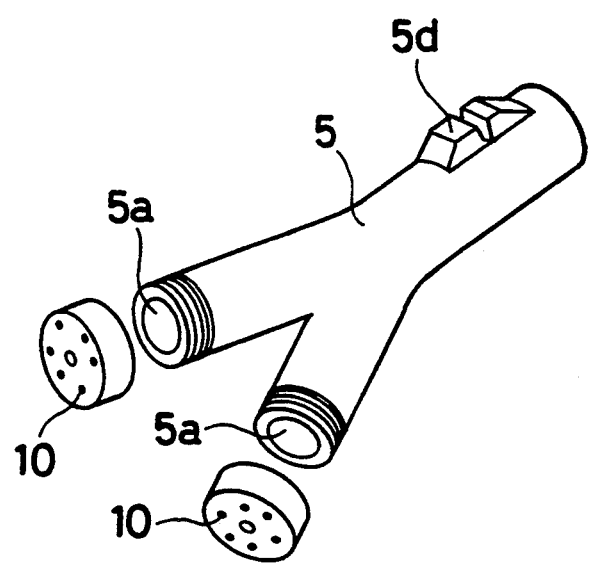
FIG. 16 is a perspective view of a modification of the tongue employed in the inflatable seatbelt system of the present invention.
Figure 17:
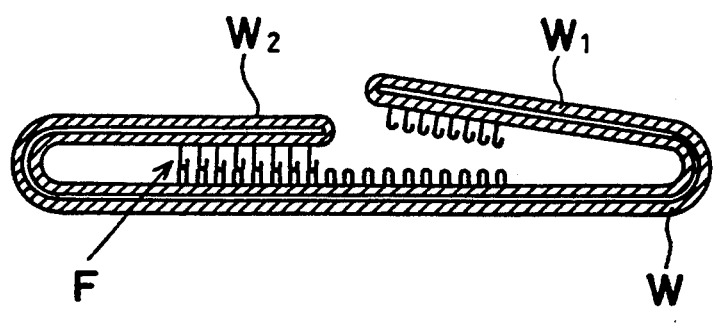
FIG. 17 is a sectional view for explanation of a method of folding a conventional inflatable seatbelt.
Figure 18:
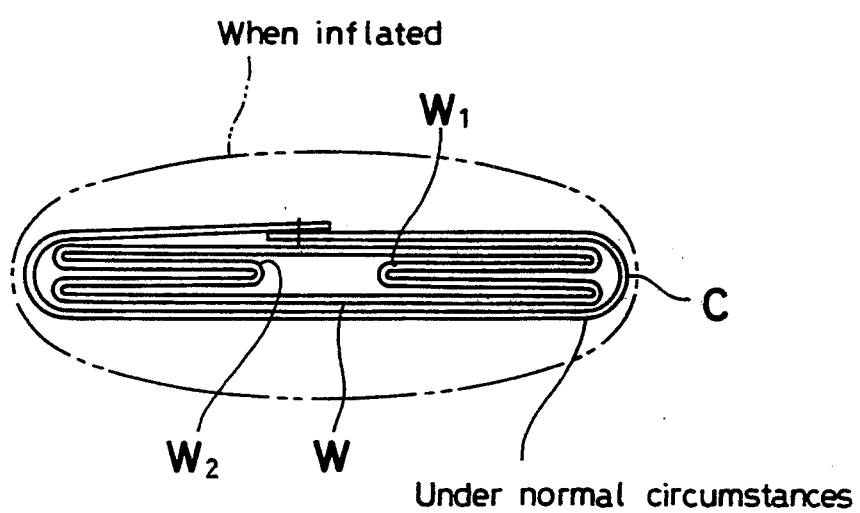
FIG. 18 is a sectional view for explanation of another method of folding a conventional inflatable seatbelt.

Further, although in the foregoing embodiments the tongue 5 is provided with only the gas flow hole 5a communicated with the shoulder belt 2, the arrangement may be such that, as shown in FIG. 16, the gas flow hole 5a provided in the tongue 5 is bifurcated, and the lap belt 3 is formed as a bag-shaped belt, thereby enabling the gas flow hole 5a to communicate with not only the shoulder belt 2 but also with the bag-shaped belt of the lap belt 3. With this arrangement, the effectiveness of the air belt can be further enhanced, and the occupant can be protected even more effectively.

As will be clear from the foregoing description, the inflatable seatbelt system of the present invention can function not only as a seatbelt for restraining the occupant's body in a similar manner to the conventional seatbelt system but also as an air belt for surely protecting the occupant from a heavy impact load by receiving the kinetic energy of the occupant's body with a relatively wide area. Since the webbing of the inflatable seatbelt system is not folded, it can be inflated speedily and smoothly.

Further, according to the present invention, the thickness of the seatbelt under normal circumstances can be reduced to an extremely small value because the webbing need not be folded. Accordingly, the seatbelt can be unwound and rewound even more smoothly. In addition, since it is possible to minimize the belt take-up capacity of the seatbelt retractor, the retractor can be formed in an even more compact structure.

Further, since the seatbelt need not be folded, it is unnecessary to conduct a seatbelt folding operation, which requires a great deal of time and labor, during the assembly of the seatbelt. Accordingly, it is possible to reduce the number of operating steps needed for the production of the seatbelt and to assemble the seatbelt extremely easily.

In addition, since the knitted fabric of the tubular webbing, which constitutes the seatbelt, can be set so that the width of the webbing when flattened is equal to the width of the conventional seatbelt, the amount of base fabric used can be reduced by a large margin in comparison to the conventional inflatable seatbelt.

The use of a knitted fabric for the webbing makes it possible to obtain extremely excellent stretching characteristics that stretching is large in the lateral direction and small in the longitudinal direction in comparison to woven fabrics.

What we claim is:

1. An inflatable seat belt system for a vehicle, which comprises:

gas generating means for generating a gas when deceleration acting on the vehicle in an emergency exceeds a first set deceleration, which indicates collision of the vehicle;

webbing having a portion brought into contact with an occupant's body, at least a part of said contact portion being formed as a bag-shaped portion; said bag-shaped portion being completely formed of a knitted fabric; said webbing being arranged in such manner that when no gas is generated from said gas generating means, said webbing is maintained in the shape of a strap with a predetermined width, and when a gas is generated from said gas generating means, said bag-shaped portion is inflated by the gas;

a tongue connected to said webbing;

a buckle device provided with said gas generating means on one end thereof and removable engaged with said tongue; and a retractor operating in such manner that when the deceleration on the vehicle is not higher than a second set deceleration, which is lower than said first set deceleration, said retractor allows said webbing to be freely wound up and unwound, and when the deceleration on the vehicle exceeds said second set deceleration, said retractor prevents unwinding of said webbing.

2. An inflatable seat belt system according to claim 1, wherein said knitted fabric is produced by weft knitting in which stitches formed in a lateral direction are connected in a longitudinal direction.

3. An inflatable seat belt system according to claim 1, wherein said knitted fabric is produced by warp knitting in which stitches formed in a longitudinal direction are connected to adjacent stitches.

4. An inflatable seat belt system according to claim 1, wherein a tube inflatable by said gas is inserted into said bag-shaped portion of said webbing.

5. An inflatable seat belt system according to claim 4, wherein said tube is made of one of urethane rubber and silicone rubber.

6. An inflatable seat belt system according to claim 1, wherein said tongue is connected to said bag-shaped portion of said webbing;

said tongue has a gas flow hole, and said buckle device includes said gas generating means on one end thereof and a gas flow hole communicating with said gas generating means, said gas flow holes of said tongue and said buckle device are aligned in an axial direction of said tongue and said buckle device; and said gas flow hole in said tongue and said gas flow hole in said buckle device form a gas flow passage for passing the gas generated by said gas generating means in said axial direction toward said bag-shaped portion of said webbing when said tongue is engaged with said buckle device.

7. An inflatable seat belt system according to claim 2, wherein a tube inflatable by said gas is inserted into said bag-shaped portion of said webbing.

8. An inflatable seat belt system according to claim 3, wherein a tube inflatable by said gas is inserted into said bag-shaped portion of said webbing.

9. An Inflatable seat belt system according to claim 2, wherein said tongue is connected to said bag-shaped portion of said webbing;

said tongue has a gas flow hole, and said buckle device includes said gas generating means on one end thereof and a gas flow hole communicating with said gas generating means, said gas flow holes of said tongue and said buckle device are aligned in an axial direction of said tongue and said buckle device; and said gas flow hole in said tongue and said gas flow hole in said buckle device form a gas flow passage for passing the gas generated by said gas generating means in said axial direction toward said bag-shaped portion of said webbing when said tongue is engaged with said buckle device.

10. An inflatable seat belt system according to claim 3, wherein said tongue is connected to said bag-shaped portion of said webbing;

said tongue has a gas flow hole, and said buckle device includes said gas generating means on one end thereof and a gas flow hole communicating with said gas generating means, said gas flow holes of said tongue and said buckle device are aligned In an axial direction of said tongue and said buckle device; and said gas flow hole In said tongue and said gas flow hole in said buckle device form a gas flow passage for passing the gas generated by said gas generating means in said axial direction toward said bag-shaped portion of said webbing when said tongue is engaged with said buckle device.

11. An inflatable seat belt system according to claim 4, wherein said tongue is connected to said bag-shaped portion of said webbing;

said tongue has a gas flow hole, and said buckle device includes said gas generating means on one end thereof and a gas flow hole communicating with said gas generating means, said gas flow holes of said tongue and said buckle device are aligned in an axial direction of said tongue and said buckle device; and said gas flow hole in said tongue and said gas flow hole in said buckle device form a gas flow passage for passing the gas generated by said gas generating means in said axial direction toward said bag-shaped portion of said webbing when said tongue is engaged with said buckle device.

12. An inflatable seat belt system according to claim 5, wherein said tongue is connected to said bag-shaped portion of said webbing;

said tongue has a gas flow hole, and said buckle device includes said gas generating means on one end thereof and a gas flow hole communicating with said gas generating means, said gas flow holes of said tongue and said buckle device are aligned in an axial direction of said tongue and said buckle device; and said gas flow hole in said tongue and said gas flow hole in said buckle device form a gas flow passage for passing the gas generated by said gas generating means in said axial direction toward said bag-shaped portion of said webbing when said tongue is engaged with said buckle device.

13. An inflatable seat belt system for a vehicle, which comprises:

gas generating means for generating a gas when deceleration acting on the vehicle in an emergency exceeds a first set deceleration, which indicates collision of the vehicle;

webbing having a portion brought into contact with an occupant's body, at least a part of said contact portion being formed as a bag-shaped portion; said bag-shaped portion being formed of a knitted fabric having warp threads inserted therein; said webbing being arranged in such manner that when no gas is generated from said gas generating means, said webbing is maintained in the shape of a strap with a predetermined width, and when a gas is generated from said gas generating means, said bag-shaped portion is inflated by the gas;

a tongue connected to said webbing;

a buckle device provided with said gas generating means on one end thereof and removable engaged with said tongue; and a retractor operating in such manner that when the deceleration on the vehicle is not higher than a second set deceleration, which is lower than said first set deceleration, said retractor allows said webbing to be freely wound up and unwound, and when the deceleration on the vehicle exceeds said second set deceleration, said retractor prevents unwinding of said webbing.

14. An inflatable scat belt system according to claim 13, wherein said bag-shaped portion of said webbing is formed by weft knitting.

15. An inflatable seat belt system according to claim 13, wherein said bag-shaped portion of said webbing is formed by warp knitting.

16. An inflatable seat belt system according to claim 13, wherein a tube inflatable by said gas is inserted into said bag-shaped portion of said webbing.

17. An inflatable seat belt system according to claim 13, wherein said tongue is connected to said bag-shaped portion of said webbing;

said tongue has a gas flow hole, and said buckle device includes said gas generating means on one end thereof and a gas flow hole communicating with said gas generating means, said gas flow holes of said tongue and said buckle device are aligned in an axial direction of said tongue and said buckle device; and said gas flow hole in said tongue and said gas flow hole in said buckle device form a gas flow passage for passing the gas generated by said gas generating means in said axial direction toward said bag-shaped portion of said webbing when said tongue is engaged with said buckle device.

* * * * *